UNITED STATES PATENT OFFICE.

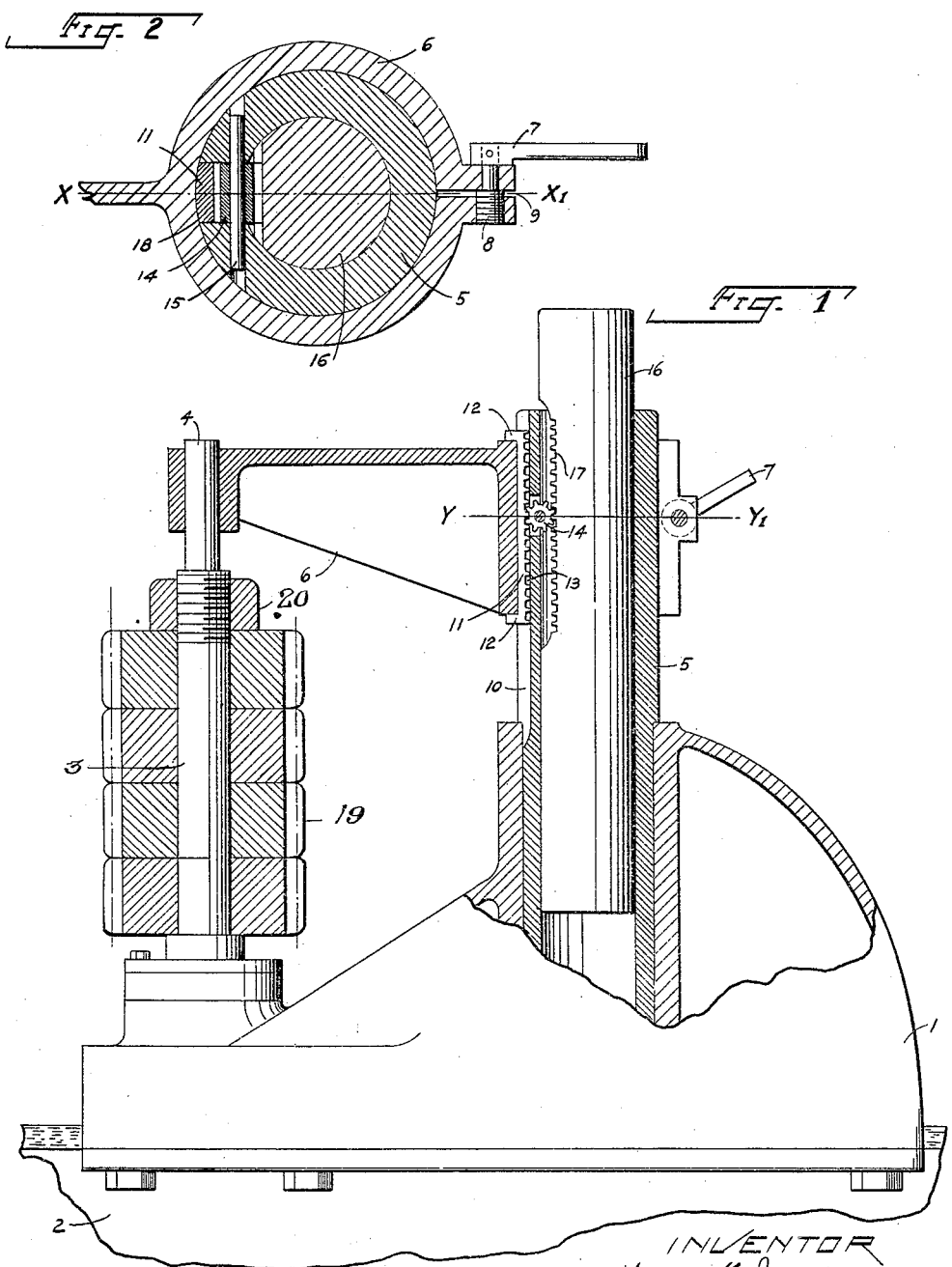

HUGO W. JACOBSON, OF ARLINGTON, NEW JERSEY, ASSIGNOR TO GOULD & EBERHARDT, OF NEWARK, NEW JERSEY, A CORPORATION OF NEW JERSEY.

ARBOR-SUPPORT.

1,304,684.  Specification of Letters Patent.  Patented May 27, 1919.

Application filed June 20, 1918. Serial No. 241,006.

*To all whom it may concern:*

Be it known that I, HUGO W. JACOBSON, a citizen of the United States, and a resident of Arlington, in the county of Hudson and State of New Jersey, have invented certain new and useful Improvements in Arbor-Supports, and do hereby declare the following specification, taken in connection with the drawings forming part of same, to be a full, clear, concise, and exact description of the invention, and the best mode contemplated to apply the principle thereof, so as to distinguish it from other inventions and to enable any person skilled in the art to which it appertains or with which it is most nearly connected to make, construct, and use the same.

This invention relates primarily to a work arbor support for use in milling or gear cutting machine.

The invention is particularly adaptable to supporting the end of a work arbor that is arranged in a vertical position. The construction is such that the bearing member may be readily moved out of the way to permit the work to be taken from the arbor.

The invention relates more particularly to a cylindrical supporting member upon which a bearing member is slidably arranged to coöperate with and support the end of the work arbor.

The primary object of this invention is to provide a novel means for counterbalancing a bearing member without interfering with the swiveling of said bearing member about the cylindrical supporting member.

This invention consists of a cylindrical supporting member provided with an opening therethrough, of a bearing member slidably and pivotally arranged about the cylindrical supporting member and a counterweight within said cylindrical member connected by gearing to said bearing member.

Other objects will be apparent from and are incorporated in the annexed drawing, and in the following description, which sets forth in detail, certain contrivances embodying means, constituting however, but one of the various mechanical forms in which the principle of the invention may be used.

The novelty of the invention will be readily understood from the drawings, which show a construction for practising the invention in its preferred form, and from the following description thereof, and is more specifically pointed out and distinctly claimed in the claims annexed to said description.

In the drawings:—

Figure 1 is a side elevation of the work carriage of a gear cutting machine showing the work arbor support partly in section as indicated at $XX_1$ of Fig. 2.

Fig. 2 is a sectional view at $YY_1$ of Fig. 1.

The drawings depict a construction primarily adapted to support the work spindle of a gear cutting machine. The principle involved, however, can be readily adapted to support the end of the cutter arbor or similar member.

To illustrate the invention the drawings show a work carriage which is slidably arranged upon a frame 2, the work arbor 3 is rotatably mounted in said carriage and the end 4 thereof is supported as now to be described.

A hollow cylindrical member 5 is securely fastened in the carriage 1 and projects beyond said carriage a sufficient distance to correspond with the length of the work arbor 3.

A bearing member 6 is arranged about said cylindrical member 5 and clamped thereto by means of the handle 7, screw 8 and slot 9. A keyway 10 is provided in the cylindrical supporting member 5 in which a rack 11 is slidably arranged. The rack 11 is provided with projecting ends 12 fitting over the bearing member 6, so that said rack is carried by said bearing member when moved in the direction of the axis of said supporting member 5. The rack 11 is provided with teeth 13 which are in engagement with a pinion 14 rotatably mounted upon a stud 15 secured in the cylindrical supporting member 5. A counterweight 16 is arranged in the hollow portion of the cylindrical supporting member 5 and is provided with rack teeth 17 which are also in engagement with said pinion 14. This gear connection between the counterweight and the bearing member 6 produces an effective counterbalancing of said bearing member in any vertical position thereof.

To enable the bearing member 6 to be swiveled about the axis of the supporting member 5 so as to permit the removal of the work from the arbor, the rack 11 is rounded on the side adjacent to the bearing member 6 as indicated at 18. The flanges or ends 12 on the rack member 11 will maintain said bearing member 6 in its vertical position due to the counterweight 16.

The arbor 4 can be used either as a cutter or work spindle. The drawings illustrate the method of holding work which consists of four gears 19 securely held by the nut 20.

Having described my invention I claim as new and desire to secure by Letters Patent:

1. In combination, a hollow supporting member, a bearing member adjustably arranged thereon, a counterweight within said hollow supporting member, and a gear connection between said counterweight and bearing member to counterbalance the latter in any position.

2. In combination, a hollow supporting member, a bearing member adjustably arranged along said supporting member, a counterweight slidably arranged within said supporting member, a gear rotatably mounted within said supporting member and connections from said gear to said bearing member and counterweight to counterbalance the bearing member in any adjusted position.

3. In combination, a hollow supporting member, a bearing member adjustable along said supporting member, a counterweight slidably arranged within said supporting member, a gear rotatably mounted in said supporting member, rack teeth upon said counterweight connected to said gear, other rack teeth upon said bearing member connected to said gear so that the bearing member is counterbalanced in any adjusted position.

4. In combination, a hollow supporting member, a bearing member adjustably mounted upon said supporting member, a counterweight slidably arranged within said supporting member, a gear rotatably mounted in said supporting member, rack teeth on said counterweight and bearing member which are arranged opposed to each other and on opposite sides of said pinion so as to counterbalance said bearing member in any adjusted position.

5. In combination, a hollow supporting member, a bearing member longitudinally and pivotally adjustable upon said bearing member, a counterweight slidably arranged in said supporting member, and a gear connection between said counterweight and bearing member to counterbalance said bearing member in any longitudinally or pivotally adjusted position.

6. In combination, a hollow supporting member, a bearing member adjustable longitudinally and pivotally upon said supporting member, a counterweight slidably arranged within said supporting member, a gear rotatably mounted in said supporting member, gear connections between said counterweight and gear, a rack carried by said bearing member and in mesh with said gear so that said bearing member can be adjusted longitudinally and pivotally without disturbing the engagement between said rack and gear.

7. In combination, a hollow supporting member, a keyway therein, a bearing member longitudinally and pivotally adjustable upon said supporting member, a gear rotatably mounted in said supporting member, a counterweight slidably arranged within said supporting member, geared connections between said counterweight and gear, a rack member arranged within said keyway in the supporting member and carried by said bearing member, said rack so arranged to counterbalance said bearing member in any other adjusted position and permit said bearing member to be pivoted about said supporting member.

8. In combination with a hollow cylindrical supporting member, a bearing member longitudinally and pivotally adjustable upon said cylindrical member, a counterweight slidably arranged within said cylindrical member, a gear rotatably mounted in said cylindrical member, geared connections between said counterweight and gear and a rack slidably mounted within said cylindrical supporting member and carried by said bearing member, said rack connected to said gear and arranged so that said bearing member can be pivoted about said cylindrical member without disturbing the position of said rack.

Signed this 18th day of June, 1918.

HUGO W. JACOBSON.

Copies of this patent may be obtained for five cents each, by addressing the "Commissioner of Patents, Washington, D. C."